(12) United States Patent
Cheung

(10) Patent No.: US 6,227,362 B1
(45) Date of Patent: May 8, 2001

(54) AUDIO-VISUAL BOX

(75) Inventor: Chung Fai Cheung, Aberdeen (HK)

(73) Assignee: Forward Electronics Manufacturing Company Limited, Aberbeen (HK)

( * ) Notice: Subject to any disclaimer, the term of this patent is extended or adjusted under 35 U.S.C. 154(b) by 0 days.

(21) Appl. No.: 09/496,882

(22) Filed: Feb. 2, 2000

(51) Int. Cl.$^7$ ................................................. B65D 85/57
(52) U.S. Cl. ........................................ 206/308.1; 206/310
(58) Field of Search ............................... 206/308.1, 310, 206/493, 307, 309–312

(56) References Cited

U.S. PATENT DOCUMENTS

| | | |
|---|---|---|
| 4,793,479 | 12/1988 | Otsuka et al. . |
| 5,251,750 | 10/1993 | Gelardi et al. . |
| 5,400,902 | 3/1995 | Kaminski . |
| 5,788,068 * | 8/1998 | Fraser et al. ......................... 206/310 |
| 5,887,713 | 3/1999 | Smith et al. . |
| 5,896,986 | 4/1999 | Bolognia et al. . |
| 5,944,181 * | 8/1999 | Lau ....................................... 206/310 |
| 5,988,375 * | 11/1999 | Chang .................................. 206/310 |
| 5,996,788 * | 12/1999 | Belden, Jr. et al. ................. 206/310 |
| 6,041,922 * | 3/2000 | Kollinek .............................. 206/310 |
| 6,041,923 * | 3/2000 | Furutsu ................................ 206/310 |
| 6,065,594 * | 5/2000 | Sankey et al. ....................... 206/310 |

FOREIGN PATENT DOCUMENTS

| | | |
|---|---|---|
| 35 12025 A1 | 10/1986 | (DE) . |
| 37 15 187 A1 | 11/1988 | (DE) . |
| 2 753 295 | 3/1998 | (FR) . |
| 2 340 481 | 2/2000 | (GB) . |
| 11-222288 | 8/1999 | (JP) . |
| WO 93/01598 | 1/1993 | (WO) . |
| WO 94/05010 | 3/1994 | (WO) . |

OTHER PUBLICATIONS

Japanese Patent Office Patent Abstracts of Japan for Pub. No. 1122288 A, Applicant Mitsumi Electric Co. Ltd., 2pp*.

* cited by examiner

*Primary Examiner*—Luan K. Bui
(74) *Attorney, Agent, or Firm*—Christie, Parker & Hale

(57) ABSTRACT

An apparatus for holding a media storage disk of a kind having a surface forming a central hole. The apparatus includes a base portion and two arms, each arm resiliently cantilevered and extending substantially perpendicular from the base portion. A disk locating means includes two portions, each having a disk engageable region. The two portions are also articulated to each other about an articulation axis and each portion is pivotally connected to one of the arms, respectively, about a pivot axis, the articulation axis located between the pivot axes. The two portions are moveable in a manner that moves the articulation axis from a side on one side of and between the two pivot axes, wherein the two portions are in a disk securing condition, to a position on the other side of and between the two pivot axes, wherein the two portions are in a disk releasing condition.

19 Claims, 9 Drawing Sheets

Figure 1:
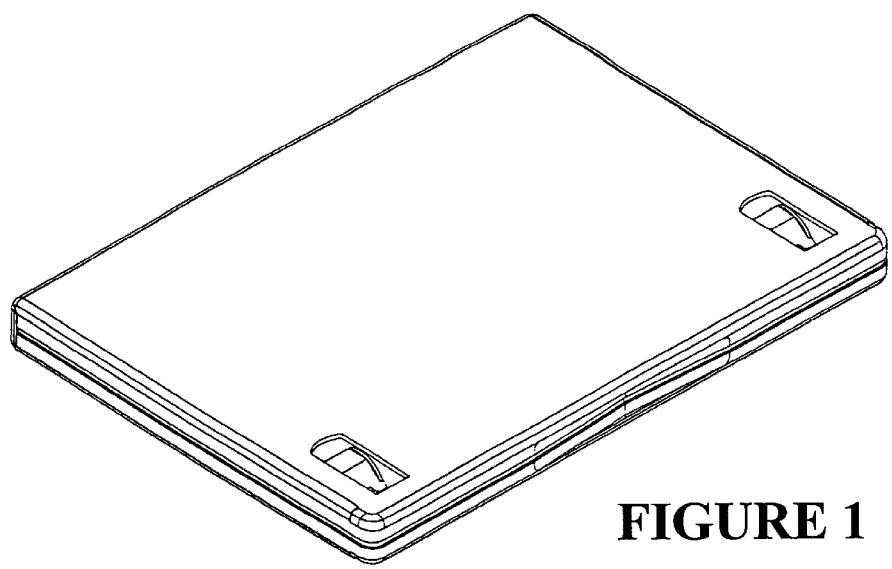

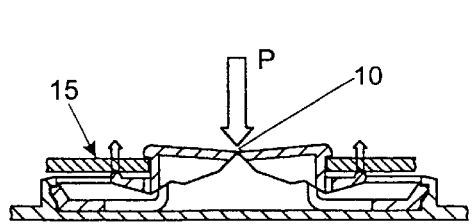
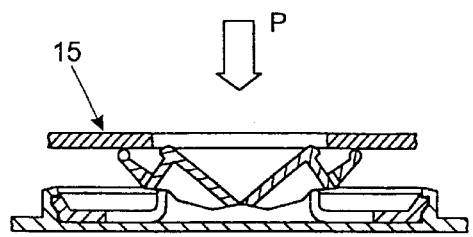
FIGURE 7          FIGURE 8
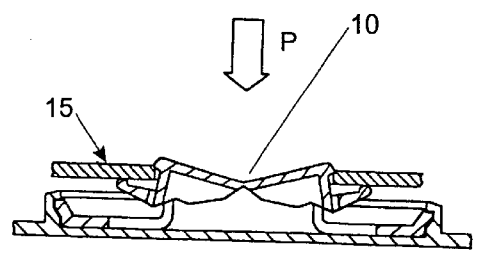
FIGURE 9
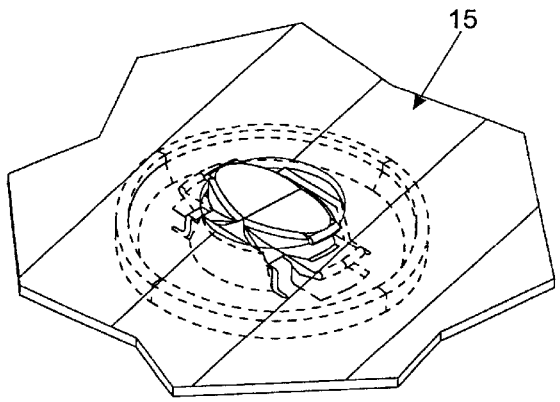
FIGURE 10
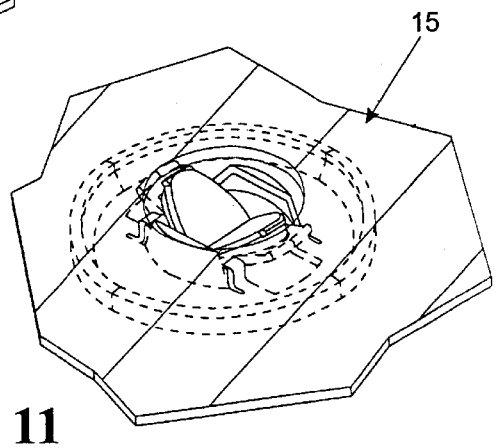
FIGURE 11

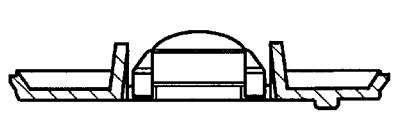
FIGURE 16  FIGURE 17
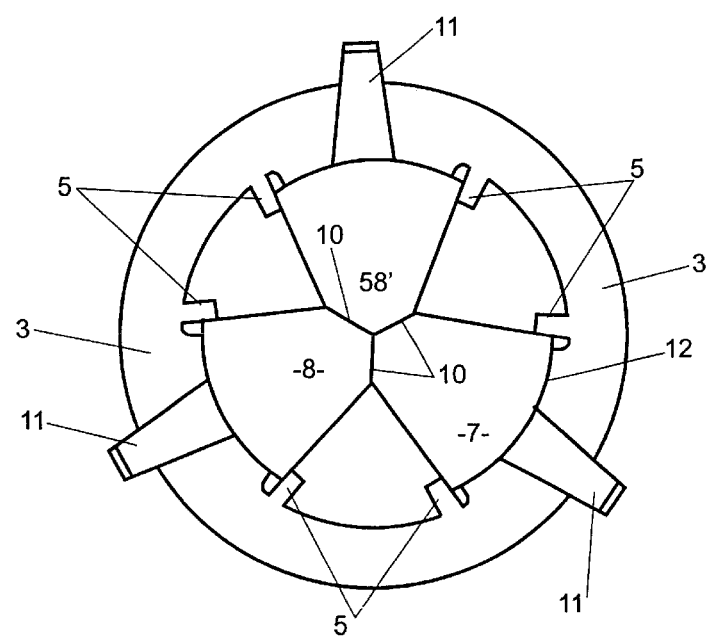
FIGURE 18

AUDIO-VISUAL BOX

FIELD OF INVENTION

The present invention relates to apparatus for holding media storage disks of a kind having a central hole.

BACKGROUND TO THE INVENTION

Media storage disks such as compact disks (CD), digital video disks (DVD) or video compact disks (VCD) have rapidly gained popularity with consumers. For the purposes of retail, transportation, and storage by the end user, such disks are normally provided contained within a case. Different types of CD, VCD or DVD cases are known. Such normally include a disk engaging means which is arranged such that when it is pressed, the perimeter profile of the engaging means changes and reduces the degree of hold that it provides to the disk. The construction of DVDs means that known disk engaging means relying on friction at an edge of the disks has become undesirable. The fact that DVDs consist of two laminated layers of polycarbonate, a frictional edge engagement and/or bending of the disk for engagement and removal can cause disk and hence data damage.

It is therefore an object of the present invention to provide improvements in or relating to apparatus for holding media storage disks of a kind having a central hole which will overcome the abovementioned disadvantages and/or at least provide the public with a useful choice.

BRIEF DESCRIPTION OF THE INVENTION

Accordingly in a first aspect the present invention consist in an apparatus for holding a media storage disk of a kind having a central hole said apparatus comprising:

base portion at least two arms each resiliently cantilevered upwardly from the base portion a disk locating means consisting of at least two portions which each include at least one disk engagable region, said at least two portions articulated to each other about at least one articulation axis and each pivotally connected to a respective arm about a pivot axis, one pivot axis for each portion and located outwardly of said articulation axis, said at least two portions movable in a manner that moves said at least one articulation axis between a position above said at least two pivot axis wherein said two portions are in a disk securing condition, and a position below said at least two pivot axis wherein said two portions are in a disk releasing condition.

Preferably said disk engagable regions each include a central hole engagable region and a lip to, in securing condition, provide a retention of said disk from moving upwardly. Preferably said disk engagable regions of said two portions are, in said disk releasing condition, more proximate to each other than in said disk securing condition.

Preferably said lips of said disk engagable regions, when said two portions are in said disk securing condition, are further apart from each other than said central hole engagable region.

Preferably said lips of said disk engagable regions, when said two portions are in said disk releasing condition, are closer to each other than said central hole engagable region of said disk engaging regions.

Preferably there is one articulation axis.

Preferably each of said at least two portions includes a member extending from said at least one disk engaging region and pivotably connected at said at least one articulation axis, to the like member of the other portion(s).

Preferably said members provide a location where said disk locating means call be toggled by the user of the apparatus from at least said disk securing condition to said disk releasing condition.

Preferably a disk lifting arm extends radially outwardly from each said portion to underlie a disk (when one is located with said apparatus) and each to move integrally with their respective portion between a position below said central hole engagable region in said disk securing condition, and a position above said central hole engagable region in said disk releasing condition.

Preferably said lifting arms locate against the downwardly facing surface of a disk in said disk releasing condition, and on application of a downward force to said disk, toggle said disk locating means from said disk releasing condition to said disk securing condition.

Preferably there are two portions and for each a respective pivot axis provided at the ends of said at least two arms.

Preferably when viewed in a direction along said axes, each of said two portion provides said articulation axis, pivot axis and said lip in a spatial arrangement to be at an apex of an imaginary triangular.

In a second aspect the present invention consists in a disk engaging apparatus to engage a disk of a kind having a central aperture said apparatus comprising a base, a disk fastening member consisting of at least two portions articulated to each other about and extending outwardly from at least one central articulation axis each portion being pivotably secured outwardly of said at least one central articulation axis to mounting members provided from said base, said mountings members are adapted to allow the pivot axis to displace inwardly and outwardly to each other but are biased towards a condition wherein the distance between the pivot axis of each portion and the articulation axis is greater than the horizontal distance component between the said pivot axis and the articulation axis, each portion of said disk fastening member presenting disk engagable regions to rotate inwardly and outwardly to each other about their respective pivot axis and to thereby respectively engage and disengage with the central aperture of the disk.

Preferably said disk fastening member also includes for each of said portions a disk lifting member having a region to contact the downwardly facing surface of a disk outwardly from said disk engagable region, and pivot axis, said disk lifting member integrally movable with its respective portion about the pivot axis.

Preferably each said disk lifting member is an arm extending radially outwardly from its respective portion and positions said disk in a disengaged condition above the disk engagable regions of each said portion.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents arc deemed to be incorporated herein as if individually set forth.

DESCRIPTION OF PREFERRED EMBODIMENT

The invention consists in the foregoing and also envisages constructions of which the following gives examples.

Figure 2:
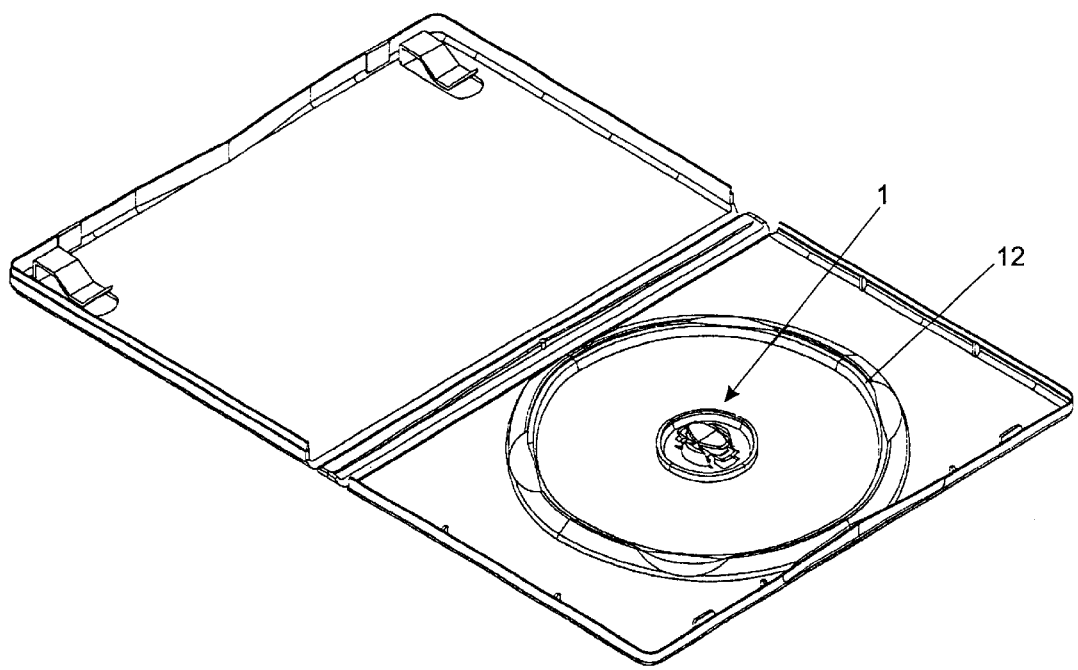
Figure 3:
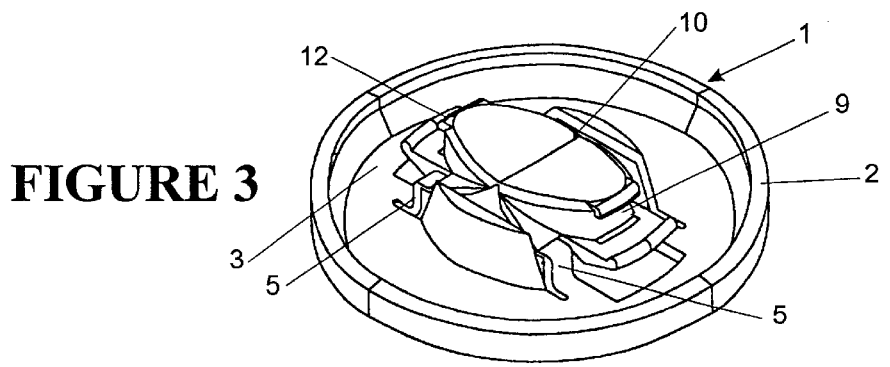
Figure 4:
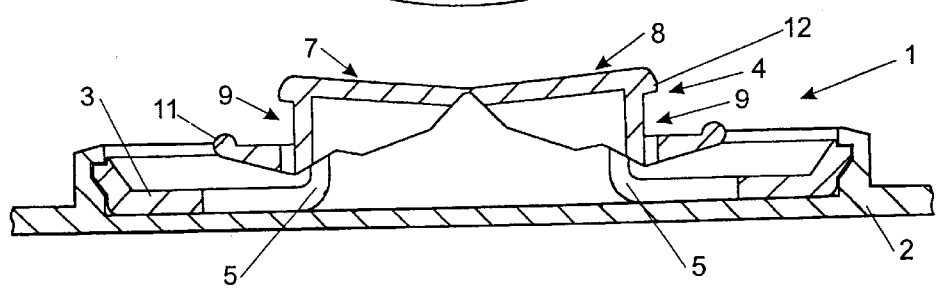
Figure 5:
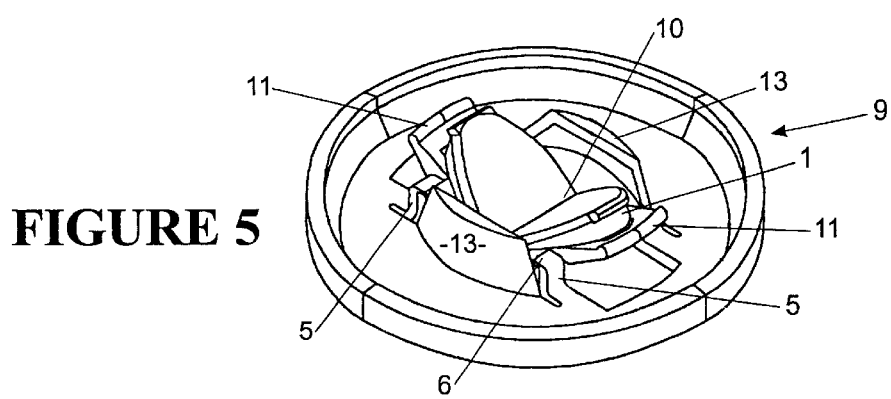
Figure 6:
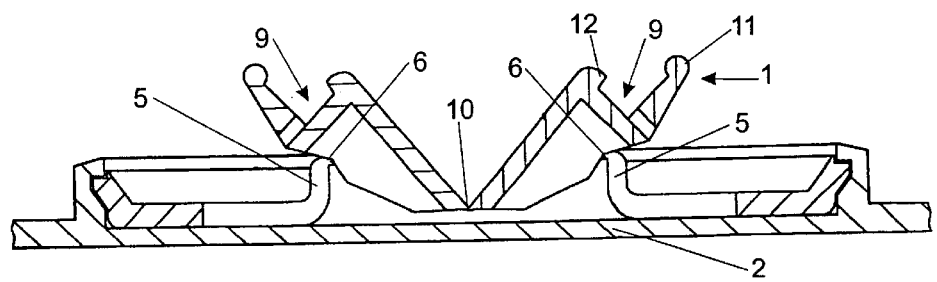
Figure 12:
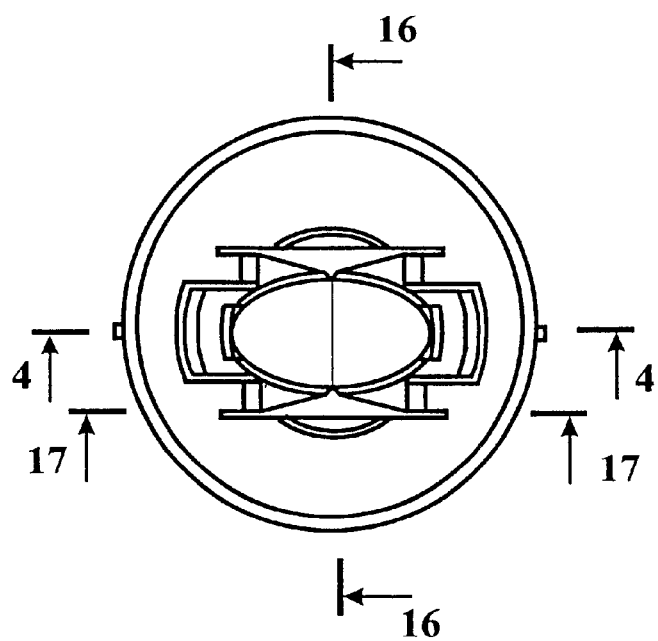
Figure 13:
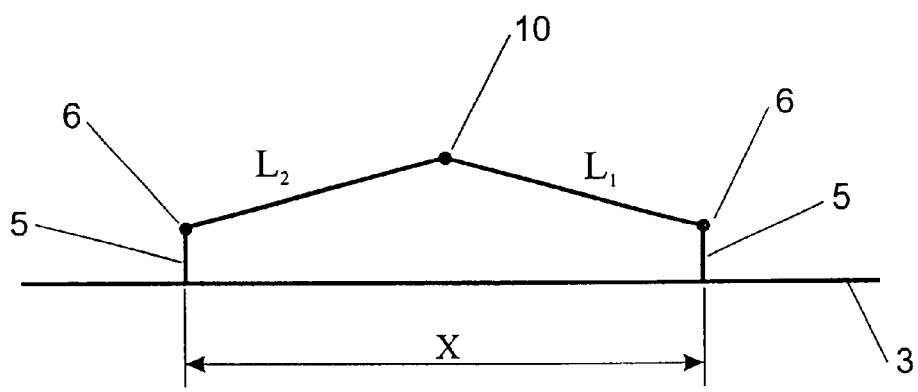
Figure 14:
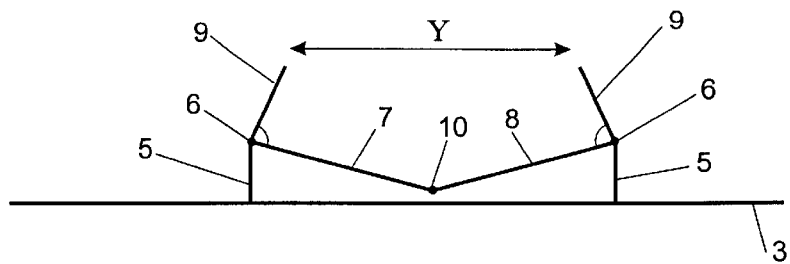
Figure 15:
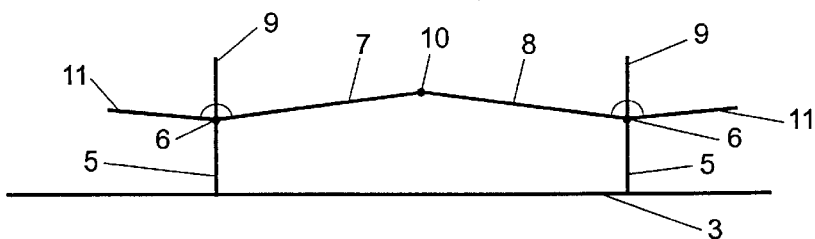
Figure 15A:
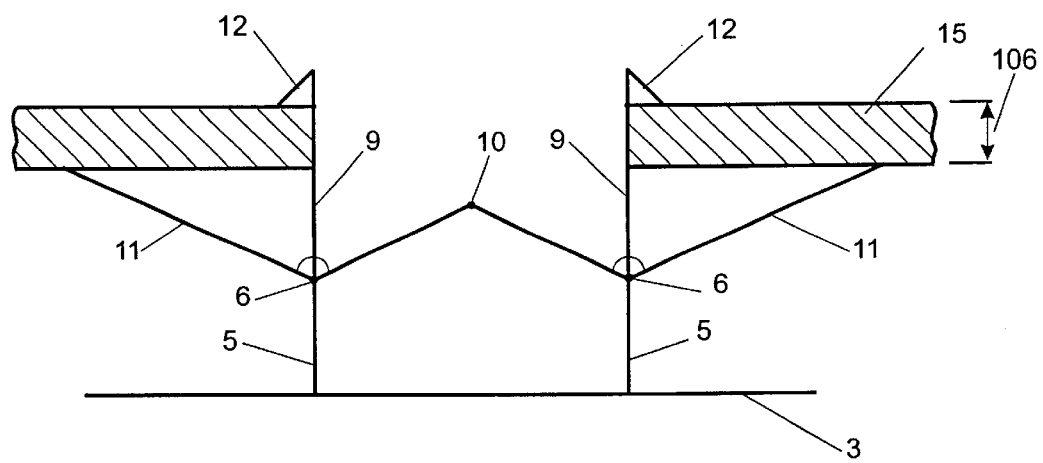
Figure 19:
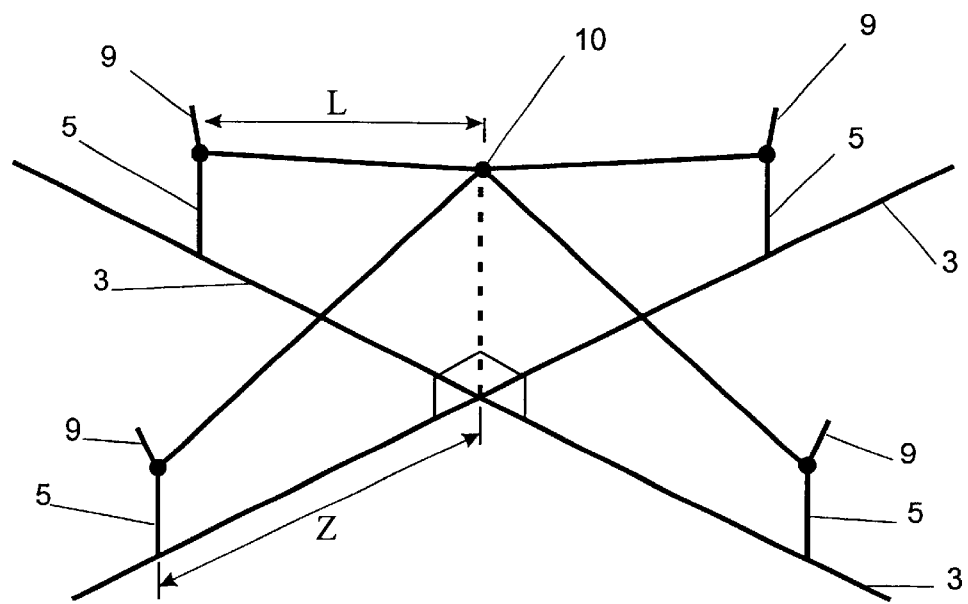
Figure 20:
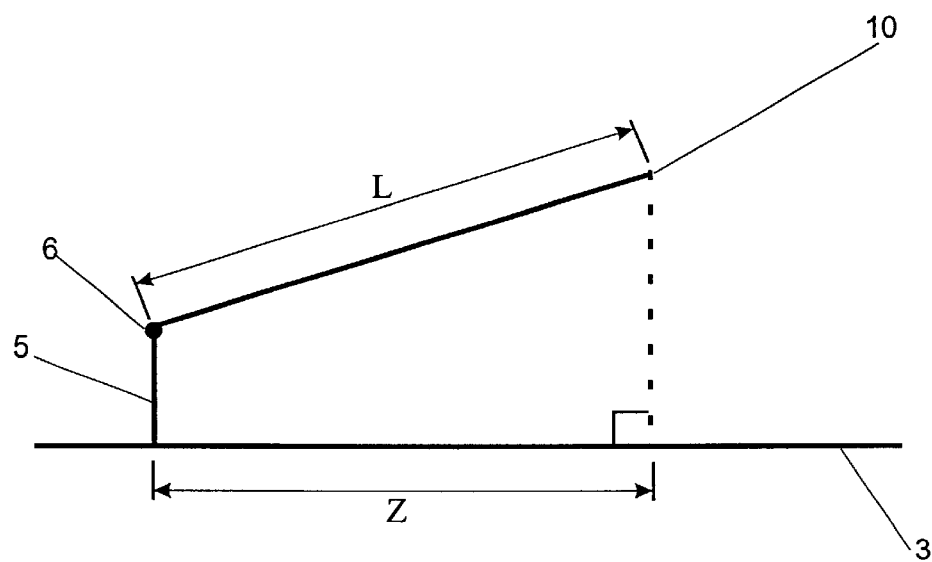
Figure 21:
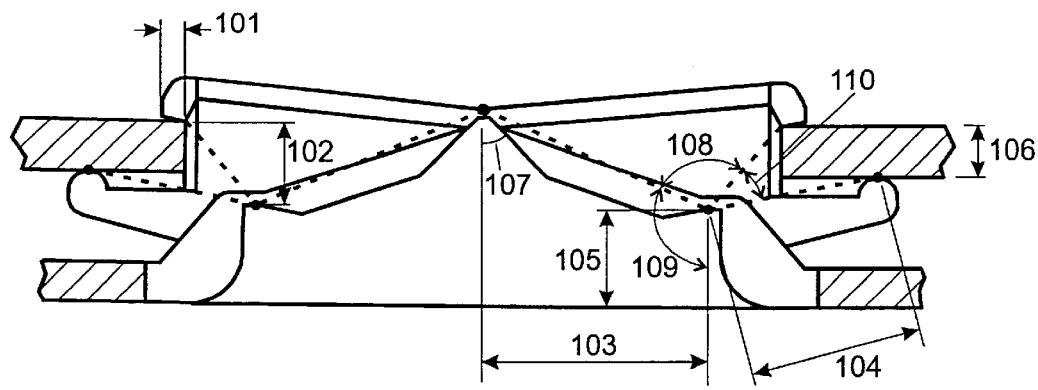
Figure 22:
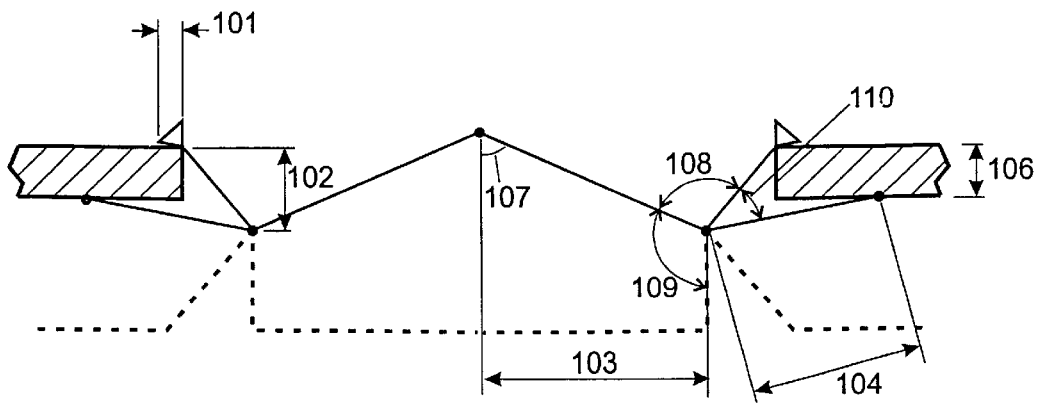
Figure 23:
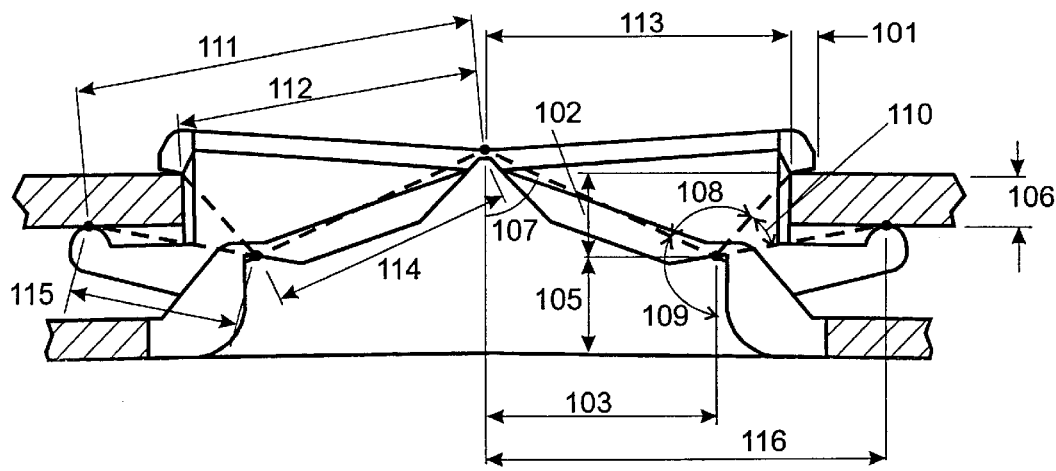
Figure 24:
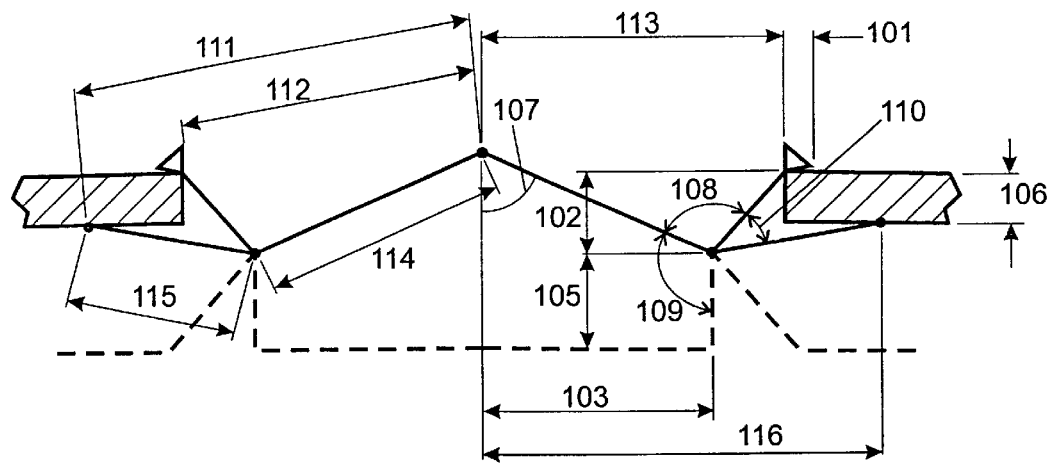

One preferred form of the present invention will now be described with reference to the accompanying drawings in which:

FIG. 1 is a perspective view of a case which incorporates the apparatus for holding the media storage disks of the present invention wherein the case is in a closed condition, FIG. 2 is a perspective view of the case of FIG. 1 in an open condition illustrating as part of one portion thereof, the apparatus of the present invention, FIG. 3 is a perspective view of the apparatus of the present invention illustrated in a disk securing condition, FIG. 4 is a sectional view through section 4—4 as shown in FIG. 12, FIG. 5 is a perspective view of the apparatus of the present invention illustrated in a disk releasing condition, FIG. 6 is a sectional view similar to FIG. 4 when the apparatus is in a disk releasing condition as shown in FIG. 5, FIG. 7 is a sectional view similar to FIG. 4 wherein the apparatus is in a disk securing condition, and illustrating (in part) a disk incorporated with the apparatus, FIG. 8 is a sectional view similar to FIG. 4 wherein the apparatus is in a disk releasing condition illustrating how a disk (shown in part) is released from the apparatus, FIG. 9 is a sectional similar to FIG. 4 intermediate of the apparatus moving between the disk securing condition and disk releasing condition, FIG. 10 is a perspective view illustrating in part, a media storage disk engaged with the apparatus of the present invention wherein the apparatus is in a disk securing condition, FIG. 11 is a perspective view illustrating in part, a media storage disk engaged with the apparatus of the present invention wherein the apparatus is in a disk releasing condition, FIG. 12 is a plan view of the apparatus of the present invention, FIG. 13 is a schematic illustration of the arrangement of the apparatus of the present invention illustrating the nature of the over centre toggle arrangement, FIG. 14 is a schematic of the apparatus of the present invention further illustrating the disk engaging regions, FIGS. 15 and 15a are schematics of the apparatus of the present invention further illustrating the disk ejection features, as FIG. 15a FIG. 16 is a sectional view through section 16—16 of FIG. 12, FIG. 17 is a sectional view through section 17—17, FIG. 18 is a plan view of an alternative of the present invention having 3 portions providing the disk engagable regions, FIG. 19 is a schematic perspective view of a 4 portioned disk engagable means of the apparatus of the present invention illustrating the preferred geometry to provide the over-centre toggle arrangement for securing and releasing the disk, FIG. 20 is a schematic side view of half of the disk engagable regions for the purposes of illustrating the preferred geometry, FIG. 21 is a sectional view through part of a disk case illustrating preferred dimensions, FIG. 22 is a schematic view of the disk engagable regions illustrating the dimensions of the preferred geometry of the present invention, and FIGS. 23–24 illustrate further dimension lines in respect of one preferred geometric arrangement of the present invention.

In the most preferred form the present invention consists of an apparatus 1 which is adapted to secure a media storage disk such as a CD, DVD, VCD or the like at their central hole. In the most common form the central hole is circular in shape however there may be media storage disks of a nature which has a different central hole or aperture other than being central and it is to be appreciated that the present invention is not to be limited to any particular shape of central hole or aperture of the media storage disk.

Where herein reference is made to upwardly and downwardly it is reference to the vertical direction with respect to the apparatus when viewed from the side as for example shown in FIG. 4. Where herein reference is made to inward and outward it is reference to the horizontal direction with respect to the apparatus when viewed from any side.

In the most preferred form the apparatus 1 is preferably incorporated with a case to provide a cover to the disk. The apparatus of the present invention is therefore designed to secure a disk in place, preferably to a case or cover or the like. With reference to FIG. 2, the case is preferably of a foldable nature to move from an open condition as shown in FIG. 2, to a closed condition as shown in FIG. 1 by folding a first portion onto a second portion. The apparatus of the present invention may be of a nature which is moulded to a portion of a case or may alternatively be secured by either snap fitting or adhesion or other securing means to the case. The apparatus is preferably provided to a portion of the case to ensure that when the disk is engaged with the apparatus, the perimeter of the disk is within the bounds of the case, at least when the case is in a closed condition.

The apparatus of the present invention may be provided as a snap fit arrangement to a base of a case, as for example as shown in FIGS. 4 and 6. The apparatus 1, by the use of suitably flexibly resilient materials, can be snap fitted to the case 2. The case 2 has a feature moulded at the point where the apparatus is to engage therewith such that the apparatus 1 can snap into place onto the base and remain securely in contact therewith. It is to be appreciated that the apparatus 1 may alternatively be provided as a unitary moulded feature as part of the case however for ease of moulding procedures, it is preferred that the apparatus 1 is provided as a separate member securable to a case 2.

In the most preferred form and with reference to FIGS. 3 and 4, the apparatus of the present invention consists of a base portion 3 which supports a central disk locating means 4 by the means of at least two arms 5. The arms 5 extend upwardly from the base portion and may be integrally moulded as part of the base. The nature of the arms is such that they are cantilevered upwardly from the base and with the use of suitable plastics material, are resiliently flexible to the base 3. The resiliently flexible nature of the arms is desired at their distal ends, which is where the central disk locating means may be supported.

The distal ends 6 of the arms supports the central disk locating means in a pivotable nature. Such pivotable nature is preferably provided as a result of a thin or weakened portion in the moulding providing the junction between the distal ends of the arms and the central disk locating means. Indeed in the most preferred form the entire apparatus of the present invention is a unitary moulded member and the junction of the distal ends of the arms and the central disk locating means is a continuation of this moulding. Therefore the provision of a weakness or reduced thickness moulding at the distal ends of the arms to provide the junction between the arms and the central disk locating means allows for the central disk locating means 4 to pivot relative to the arms. Such pivoting is illustrated in the movement between the condition of the apparatus in FIG. 4 and FIG. 6. In the most preferred form as shown in FIGS. 1–12 the axis of pivot at the distal ends of the arms, of the central disk locating means are substantially parallel. In the most preferred form as shown in these representations there are two sets of arms, one set for each axis of pivot for the central disk locating means. The set preferably consists of two arms resiliently cantilevered from the base portion wherein each set supports one portion of the central disk locating means, each portion 7, 8 of the central disk locating means provides at least one disk engaging region 9. The disk engaging regions of each portion 7, 8 are pivotable as part of each of the portions, about the axis provided at the distal ends of the at least two arms 5.

The two portions 7, 8 are hingeably secured to each other along an articulation axis 10. Preferably the articulation axis is provided at the junction of the two portions 7, 8 as a result of a weakening of the moulding at this junction. Such a weakening is preferably provided by a reduced thickness defining the articulation axis There may however be provided two articulation axes and wherein in such an arrangement the two portions are connected by an intermediate member.

In an alternative form as shown in FIG. 18 wherein there are provided three portions 7,8, and 58 which are each connected to each other along articulation axes 10. In this arrangement there are provided three pivot axes, 1 for each of the portions to pivot in respect of the supporting arms 5, and three articulation axes, two for each portion connecting it to the other of the two portions of the disk engaging member.

As a result of the cantilevered nature of the arms 5 and as a result of the flexible material employed for the moulding of the apparatus of the present invention, the articulation axis 10 is able to move from a first condition as shown in FIGS. 3 and 4 to a second condition as shown in FIG. 5 and 6 by allowing the axis 10 to move through an imaginary plane defined through both of the pivot axis 6. The rigidity of the arms to allow the movement of the apparatus between its first and second condition, can be adjusted by material choice and geometric shape. Selection of a suitably rigid form of the arms 5 may be necessary to ensure that the apparatus when moved from the first condition to the second condition remains in the second condition. There will be a tendency for the apparatus to be biased towards a condition in which the material to define the apparatus was moulded. Therefore suitably rigid arms 5 need to be provided to overcome such a moulding bias moving unintentionally back to the first condition.

The movement of the two portions of the disk locating means from its first to its second condition (disk securing condition to disk releasing condition respectively) and visa versa is of a toggle or over-centre nature. This nature is such that when axis 10 is on either side of the plane through the pivot axis, the arms will bias the two portions to remain on that side of the plane. When the articulation axis 10 moves towards the plane, the arms 5 are displaced apart which results in an increase in force back towards each other to encourage the axis to remain on that side of the plane. However with the application of suitable force by the user of the apparatus the articulation axis 10 can move from one side of the plane and snap through to the other.

With reference to FIG. 13 the preferred geometrical arrangement to provide such an over-centre nature of movement of the central disk locating means is described. The distance X which is the distance between the pivot axes 6 is attached, is less than the sum of the distances $L_1$ and $L_2$ being the distance between each pivot axis 6 and the articulation axis 10. Movement of the articulation axis 10 towards the plane between points 6 will result in distance X from increasing as result of the resilient and cantilevered natures of the arms 5 providing the axis 6. This movement apart will continue until the articulation axis 10 is in line with points 6 (i.e. at the plane) at which stage the articulation axis 10 will snap through the line and move to the other side thereof.

With reference to FIG. 14 the disk engaging regions 9 of each portion are located such that when the portions 7, 8 are in the first condition (the disk securing condition) the distance Y between the disk engaging regions is substantially equal to the diameter of the central hole of the disk. When the two portions of the disk locating means are in the second (disk releasing condition) the distance Y between the disk engaging regions is less than the diameter of the central hole of the disk and hence allows for the disk to be removable from the disk locating means. Such inward and outward movement of the disk engaging regions 9 allows for selective engagement and disengagement of a disk with the apparatus of the present invention. Illustrated in FIG. 14 the disk engaging regions 9 which are integral with the portions 7, 8 move towards each other when the articulation axis 10 is below the plane of the pivot axes 6.

Each portion 7, 8 of the central disk locating means is preferably also provided with a disk lifting member 11. When the central disk locating means is in its disk securing condition, as shown in FIGS. 4, 7 and for example schematically in FIG. 15 the disk lifting means 11 which are preferably extensions or arms from each of the portions underlie the downwardly facing surface of the disk. In this condition the disk lifting means 11 may provide an upwardly support to the disk, if such is not already provided by other parts of the apparatus or by for example a perimeter upstand 13 of the case.

In moving from the disk securing condition to the disk releasing condition, the pivoting of each portion about the pivot axis 6 results in the distance Y from decreasing, and results in the disk lifting means 11 from pivoting towards each other. This in turn will result in the distal ends of the ejections means 11 from moving upwardly and applying an upward force to the disk on its downwardly facing surface. This upward force moves the disk upwardly and to a position where it can be easily grasped by a user who is wishing to remove the disk from the case. The movement from the disk securing condition to the disk releasing condition is preferably achieved by applying a force by for example a digit of the user, to the portions at substantially the articulation axis 10. With reference to FIG. 7, 8 and 9 it can be seen how the application of the force at substantially this point will move this point from being above the plane between the pivot axes 6 to below and result in the movement of the central disk locating means from a securing condition to a releasing condition.

In moving from a disk releasing condition to a disk engaging condition, movement of the articulation axis is from below the plane between the axes 6 to above the plane. Such motion may be achieved by allowing the digit of the user to grasp the portions at or near the articulation axis and apply a force upwardly. However in the most preferred and certainly the most convenient form of the present invention such movement from a disk releasing condition to a disk engaging condition is provided by the application of a force to the disk lifting means 11. Referring to FIG. 8 it can be seen that when a downward force is applied to the disk, the lifting means 11 move downwardly and the lips 12 move upwardly and outwardly to engage the disk. With reference to the detailed preferred embodiment, since the points of contact with the downwardly facing surface of a disk and the disk lifting means are on the opposite side to the pivot axes 6 to where the force for releasing the disk from the apparatus (at or near the articulation axes 10) can be provided, with the application of a downward force onto the disk a rotation of each portion about the pivot axes 6 in a sense to move the disk engaging regions 9 upwardly and outwardly can be provided.

The disk engaging regions 9 are preferably provided with a lip 12 which prevent the disk (when the portions are in the disk securing condition) from lifting off the disk locating means. The lips, when in a disk securing condition, will locate against the upper surface of the disk, to prevent the disk from being lifted off the disk locating means.

The preferred geometry of the disk locating means is such that the movement of the disk engaging regions and the lips prevents any significant bending of the disk when being engaged and disengaged and also has no or minimal edge frictional effects on the disk at its central aperture.

When pressure is applied to the articulation axis 10, the ejection arms 11 will push the disk upwards and move the lips 12 inwardly such that the distance Y is reduced and the disk will be free for removal. The preferred embodiment will therefore reduce or minimise any delamination problems for the disk.

Stability for the disk may be provided by upstands 13 from the base 3. These upstands provide an outside perimeter region substantially identical to the shape of the central hole of the disk and allow for the hole of the disk to locate against these upstands 13.

In order to provide flexibility to the cantilevered arms, the arms are preferably of a "S" shaped nature when viewed in the direction of the cross section 4—4 of FIG. 12.

The arms are preferably provided to locate with the disk engaging means at regions towards each side of the portions. In an alternative configuration however the arms may locate with the disk engaging means from underneath of each of the portions. FIG. 17 being a cross section through section 17—17 shows the most preferred form where the ends of the arms at point 6, are at locations beside and on each side of the portions of the disk engaging means.

With reference to FIG. 15a, the apparatus when in a disk securing position provides the lifting arms extending from the portions at such an angle and of such geometry, that when a disk is located with the apparatus, the distance in a vertical direction between the downwardly facing surfaces of the lips 12 and the disk engaging regions of the lifting arms 11, is substantially equal to the vertical thickness 106 of the disk 15.

In respect of any number of portions provided as part of said disk locating member, the over-centre natured geometry can be illustrated with reference to FIG. 19. The arms as a result of the flexibly resilient nature of the material used and by the preferred cantilevered arrangement, are able to move the pivot axes 6 inwardly and outwardly relative to each other. The bias of the arms is to move the pivot points closer to each other and to a position where the horizontal component distance Z between the pivot and the articulation axis 10 is less than the distance L between the pivot axis and the articulation axis. FIGS. 21 and 23 illustrate part of the apparatus of the present invention and the various dimensions of one example of geometric arrangement where reference to the table below is made. FIGS. 22 and 24 are schematic illustrations of FIGS. 21 and 23 respectively.

|  | Length in mm | Degrees |
| --- | --- | --- |
| 101 | .6 |  |
| 102 | 2.1 |  |
| 103 | 5.71 |  |
| 104 | 4.26 |  |
| 105 | 2.55 |  |
| 106 | 1.3 |  |
| 107 |  | 66 |
| 108 |  | 106.4 |
| 109 |  | 114 |
| 110 |  | 38.6 |
| 111 | 10.05 |  |
| 112 | 7.51 |  |
| 113 | 7.50 |  |
| 114 | 6.25 |  |
| 115 | 4.26 |  |
| 116 | 9.90 |  |

What is claimed is:

1. An apparatus for holding a media storage disk of a kind having a surface forming a central hole said apparatus comprising:

a base portion;

two arms, each resiliently cantilevered and extending substantially perpendicular from the base portion;

a disk locating means including two portions, each one of the two portions including a disk engagable region, the two portions articulated to each other about an articulation axis and each portion pivotally connected to one of the arms, respectively, about a pivot axis, the articulation axis located between the pivot axes, the two portions movable in a manner that moves the articulation axis from a position on one side of and between the two pivot axes wherein said two portions are in a disk securing condition, to a position on the other side of and between the two pivot axes wherein said two portions are in a disk releasing condition.

2. An apparatus as claimed in claim 1 wherein each disk engagable region includes an outer peripheral surface located to face outwardly toward the surface of the media storage disk that forms the central hole when the media storage disk is secured to the apparatus in the disk securing condition and wherein the surfaces of the disk engagable regions are, in the disk releasing condition, more proximate to each other than in the disk securing condition.

3. An apparatus as claimed in claim 1 wherein each disk engagable region includes an outer peripheral surface located to face outwardly toward the surface of the media storage disk that forms the central hole when the media storage disk is secured to the apparatus in the disk securing condition and a lip located outwardly of the outer peripheral surface to, in securing condition, provide a retention of said disk from moving upwardly.

4. An apparatus as claimed in claim 3 wherein the lips of the disk engagable regions, when the two portions are in the disk securing condition, are further apart from each other than the outer peripheral surfaces.

5. An apparatus as claimed in claims 3 or 4 wherein the lips of the disk engagable regions, when the two portions are in the disk releasing condition, are closer to each other than the outer peripheral surfaces of the disk engagable regions.

6. An apparatus as claimed in claim 1 wherein there is only one articulation axis.

7. An apparatus as claimed in claim 1 wherein each of the two portions includes a member extending from its respective disk engaging region, the members pivotably connected to each other at the articulation axis.

8. An apparatus as claimed in claim 7 wherein the members provide a location where the disk locating means can be toggled by the user of the apparatus from the disk securing condition to the disk releasing condition.

9. An apparatus as claimed in claim 3 wherein a disk lifting arm extends radially outwardly from each portion and moves integrally with its respective portion between
- a position below the outer peripheral surface in the disk securing condition, and
- a position above the outer peripheral surface in the disk releasing condition.

10. An apparatus as claimed in claim 9 wherein the lifting arms locate against a downwardly facing surface of the disk in the disk releasing condition, and on application of a downward force to the disks, toggle the disk locating means from the disk releasing condition to the disk securing condition.

11. An apparatus as claimed in claim 1 wherein there are only two portions, each portion having a respective pivot axis provided at the end of its respective arm.

12. An apparatus as claimed in claim 3 wherein, when viewed in a direction along the pivot axes, each of the two portions are oriented to provide the articulation axis, one respective pivot axis and one respective lip at respective apices of an imaginary triangle.

13. The apparatus of claim 1 wherein the articulation axis and the pivot axes are located in an over center arrangement wherein movement between the disk securing condition and the disk releasing condition requires movement through an over center position.

14. The apparatus of claim 13 wherein the articulation axis is biased to the one side when it is located on the one side and is biased to the other side when it is located on the other side.

15. The apparatus of claim 13, wherein the articulation axis and the pivot axes are parallel and wherein the articulation axis passes through an imaginary plane through both pivot axes when it moves from one side to the other side.

16. The apparatus of claim 15, wherein each pivot axis is formed by two arms.

17. A disk engaging apparatus to engage a disk of a kind having a surface forming a central aperture said apparatus comprising
- a base,
- mounting members extending substantially perpendicular from the base,
- a disk fastening member having of two portions articulated to each other about and extending outwardly from a central articulation axis
- each portion being pivotally secured outwardly of the central articulation axis to one of the mounting members, respectively, about a pivot axis,
- the said mounting members being adapted to allow the two pivot axes to displace inwardly and outwardly to each other but are biased towards a condition wherein the distance between the pivot axis of each portion and the articulation axis is greater than the horizontal distance component between the pivot axis of each portion and the articulation axis,
- each portion of the disk fastening member presenting a disk engagable region to rotate inwardly and outwardly relative to the articulation axis about its respective pivot axis and to thereby respectively engage and disengage with the central aperture of the disk.

18. An apparatus as claimed in claim 17 wherein the disk fastening member also includes for each portion a disk lifting member having a region to contact the downwardly facing surface of a disk outwardly from the disk engagable region, each disk lifting member integrally movable with its respective portion about the respective pivot axis.

19. An apparatus as claimed in claim 18 wherein each disk lifting member is an arm extending radially outwardly from its respective portion and positions the disk in a disengaged condition above the disk engagable region of each portion.

* * * * *